(12) United States Patent
Gopalan

(10) Patent No.: US 11,297,183 B2
(45) Date of Patent: Apr. 5, 2022

(54) METHOD AND APPARATUS FOR PREDICTING CUSTOMER BEHAVIOR

(71) Applicant: Uniphore Software Systems, Inc., Palo Alto, CA (US)

(72) Inventor: Sindhuja Gopalan, Chennai (IN)

(73) Assignee: Uniphore Technologies Inc., Palo Alto, CA (US)

(*) Notice: Subject to any disclaimer, the term of this patent is extended or adjusted under 35 U.S.C. 154(b) by 65 days.

(21) Appl. No.: 16/939,469

(22) Filed: Jul. 27, 2020

(65) Prior Publication Data
US 2021/0321000 A1    Oct. 14, 2021

(51) Int. Cl.
| | |
|---|---|
| H04M 3/51 | (2006.01) |
| G06N 7/00 | (2006.01) |
| G06N 20/00 | (2019.01) |
| G10L 15/26 | (2006.01) |
| G10L 25/63 | (2013.01) |
| G06Q 30/02 | (2012.01) |
| G10L 15/18 | (2013.01) |

(52) U.S. Cl.
CPC .......... H04M 3/5175 (2013.01); G06N 7/005 (2013.01); G06N 20/00 (2019.01); G06Q 30/0201 (2013.01); G10L 15/1807 (2013.01)

(58) Field of Classification Search
CPC ..... H04M 3/5175; G06N 20/00; G06N 7/005; G10L 15/26; G10L 25/63
USPC ............ 379/265.06, 265.03, 265.07, 265.08, 379/265.05
See application file for complete search history.

(56) References Cited

U.S. PATENT DOCUMENTS 8,630,892 B2 * 1/2014 Bhalla .................... G06Q 30/02
                                                705/7.31
10,152,681 B2 * 12/2018 Stephan ............... G06Q 10/063

* cited by examiner

*Primary Examiner* — Thjuan K Addy
(74) *Attorney, Agent, or Firm* — Praveer K. Gupta

(57) ABSTRACT

A method and apparatus for predicting customer behavior is disclosed. The method comprises organizing a transcribed, diarized text of a conversation in a call, into a predefined number of sets, determining features corresponding to a sentiment score, a percentage and/or count of positive words, and a percentage and/or count of negative words for each of the a predefined number of sets, determining word count features corresponding to the word count for each of the a predefined number of sets, determining features corresponding to a call talk time, a call hold time and a call hold percentage based on the transcribed text. Based on all the determined features, the method determines whether the customer is satisfied or not, the customer activity based on an activity profile of the customer, and whether the customer used escalation terms based on the transcribed text. Based on the customer satisfaction, customer activity, and the customer use of escalation terms, the method determines a probability of a customer action.

10 Claims, 2 Drawing Sheets

METHOD AND APPARATUS FOR PREDICTING CUSTOMER BEHAVIOR

CROSS-REFERENCE TO RELATED APPLICATIONS

This Applications claims priority to the Indian Patent Application Number 202011015761, filed on Apr. 11, 2020, which is hereby incorporated by reference in its entirety.

FIELD

The present invention relates generally to improving call center computing and management systems, and particularly to predicting customer behavior in response to service provided to the customer.

BACKGROUND

Several businesses need to provide support to its customers, which is provided by a customer care call center. Customers place a call to the call center, where customer service agents address and resolve customer issues pertaining to a business. An agent, who is a user of a computerized call management system, is expected to address the issue(s) raised by the customer to the satisfaction of the customer. However, customer may or may not be satisfied with the actions taken by the agent, may publish the resulting dissatisfaction on social media and/or may abandon patronizing the business.

There exists a need for techniques for predicting customer behavior, so that mitigating action may be taken, if needed.

SUMMARY

The present invention provides a method and an apparatus for predicting customer behavior, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for predicting customer behavior. Audio of a call comprising two speakers, for example, an agent and a customer, is diarized or split into that of different speakers if needed, and transcribed. The transcripts are divided in to twelve parts corresponding to a beginning, a middle and an end of a call. For each part, a sentiment score, percentage or count of positive words and percentage or count of negative words is determined, yielding 36 features, and a count of words for each of the 12 parts is determined, yielding 12 features. Additionally, call talk time, call hold time and call hold percentage are calculated for the entire call, yielding three metadata features. Combined, a total of 51 (36+12+3) features are then processed by a customer satisfaction (CSAT) prediction system, which is an artificial intelligence or machine learning (AI/ML) based system, trained on the fifty-one features. The CSAT system predicts whether the customer is satisfied or dissatisfied. Based on the output by the CSAT system, and a profile of the customer, which includes how active the customer is on social media, and whether the user mentioned any escalation terms in the call, a propensity of the customer to escalate on social media is determined.

Figure 1:
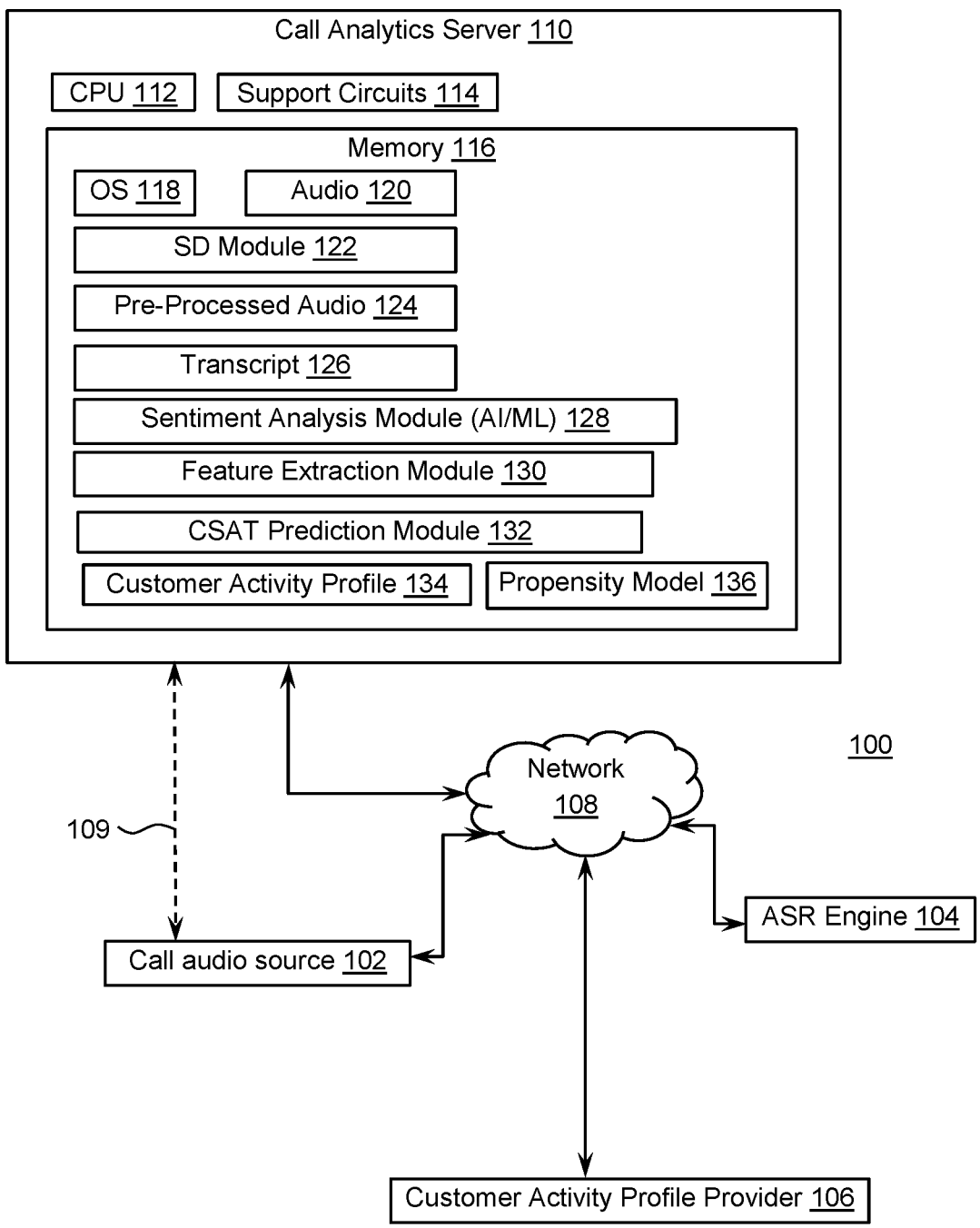
FIG. 1 is a schematic diagram depicting an apparatus for predicting customer behavior on social media, in accordance with an embodiment of the present invention.

FIG. 1 is a schematic diagram an apparatus 100 for predicting customer behavior, in accordance with an embodiment of the present invention. The apparatus 100 is deployed, for example, in a call center or associated with a call center. The apparatus 100 comprises a call audio source 102, an ASR engine 104, a customer activity profile provider 106, and a call analytics server (CAS) 110, each communicably coupled via a network 108. In some embodiments, the call audio source 102 is communicably coupled to the CAS 110 directly via a link 109, separate from the network 108, and may or may not be communicably coupled to the network 108.

The call audio source 102 provides audio of a call to the CAS 110. In some embodiments, the call audio source 102 is a call center providing live audio of an ongoing call. In some embodiments, the call audio source 102 stores multiple call audios, for example, received from a call center.

The ASR engine 104 is any of the several commercially available or otherwise well-known ASR engines, providing ASR as a service from a cloud-based server, or an ASR engine which can be developed using known techniques. The ASR engines are capable of transcribing speech data to corresponding text data using automatic speech recognition (ASR) techniques as generally known in the art. In some embodiments, the ASR engine 104 may be deployed on the CAS 110 or may be local to the CAS 110.

The network 108 is a communication network, such as any of the several communication networks known in the art, and for example a packet data switching network such as the Internet, a proprietary network, a wireless GSM network, among others. The network 108 communicates data to and from the call audio source 102 (if connected), the ASR engine 104 and the CAS 110.

The CAS server 110 includes a CPU 112 communicatively coupled to support circuits 114 and a memory 124. The CPU 112 may be any commercially available processor, microprocessor, microcontroller, and the like. The support circuits 114 comprise well-known circuits that provide functionality to the CPU 112, such as, a user interface, clock circuits, network communications, cache, power supplies, I/O circuits, and the like. The memory 116 is any form of digital storage used for storing data and executable software. Such memory includes, but is not limited to, random access memory, read only memory, disk storage, optical storage, and the like.

The memory 116 includes computer readable instructions corresponding to an operating system (OS) 118, an audio 120 (for example, received from the call audio source 102), a speaker diarization (SD) module 122, a pre-processed audio 124, transcripts 126 of the pre-processed audio 124, sentiment analysis module (SAM) 128, feature extraction module (FEM) 130, CAST prediction module (CPM) 132, a customer activity profile 134 and a propensity model 136.

According to some embodiments, the audio 120 is processed by the SD module 122 to diarize the audio 120 according to each speaker. The SD module 122 generates distinct segments of audio corresponding to different speakers, yielding the speaker-diarized pre-processed audio 124, containing segments according to speaker.

The diarized audio segments from the pre-processed audio 124 are then transcribed for example by the ASR engine 104, which yields text transcripts 126 corresponding to the pre-processed audio 124. That is, the transcripts 126 comprise distinct transcripts corresponding to distinct segments of audio, each segment corresponding to a distinct speaker, comprised in the pre-processed audio 124. Each of the transcripts 126 includes timestamps corresponding to the audio 120 or pre-processed audio 124.

The sentiment analysis module (SAM) 128 is configured to determine sentiment and/or sentiment scores from the text, and count and/or percentage of all words corresponding to each sentiment, based on text transcript(s) of a conversation. The SAM 128 identifies sentiments from text and classifies them into three sentiments, namely, positive, negative or neutral. For example, in a sentence "I liked the movie," the SAM 128 ignores the article "the" and determines that there are two neutral sentiment words (I, movie), one positive word (liked) and no negative words. The SAM 128 also determines that the sentiment is positive and the sentiment score is 1. The SAM 128 uses a lexical feature (n-gram feature), a syntactic feature (Parts of Speech (PoS)), a combination of lexical and syntactic features, and lexicon-based features to determine the sentiment scores and count of positive and negative words. In some embodiments, the SAM 128 is a close-ended algorithmic module. In some embodiments, the SAM 128 is implemented as an AI/ML module built by vectorizing lexicon-based features, for example, polarity scores of the text obtained from lexicon-based approach. These features are converted to feature vectors using TF-IDF vectorizer, and an AI/ML model is built over such feature vectors.

The SAM 128 organizes the received text transcripts 126 into 12 different text sets corresponding to (1) entire call; (2) entire agent conversation; (3) entire customer conversation; (4) call beginning, (5) call middle, (6) call end, (7) beginning of agent conversation, (8) middle of agent conversation, (9) end of agent conversation, (10) beginning of customer conversation, (11) middle of customer conversation, and (12) end of customer conversation. The SAM 128 performs sentiment analysis on each of the 12 text sets, and for each set, determines a sentiment score, a count or percentage of positive words and a count or percentage of negative words. In some embodiments, the SAM 128 also determines a sentiment corresponding to one of positive, neutral or negative for each of the 12 sets, or any combination thereof, including for the entire call.

The feature extraction module (FEM) 130 counts all words in each of the 12 sets, yielding 12 features, and call talk time, call hold time and call hold percentage for the entire call, yielding 3 features. In this manner, 36 features are extracted by the SAM 128 and 15 (12+3) features are extracted by the FEM 130, yielding a total of 51 features.

The CPM 132 is an artificial intelligence (AI) and/or machine learning (ML) based module, which is trained on the 51 features, to determine based on an input of 51 features determined by the SAM 128 and the FEM 130, whether the customer is satisfied or not. The output from the CPM 132 is binary, that is, either the customer is determined to be satisfied or the customer is determined to be dissatisfied. In some embodiments, the FEM 130 is implemented as a part of CPM 132.

The customer activity profile 134 includes information on how active the customer is on social media. In some embodiments, the customer activity profile 134 includes a characterization of whether the customer is active on one or more social media platform(s), for example, a binary determination, or an activity score, or both. In some embodiments, the binary determination is made based on the customer activity profile 134 by the propensity model 136. The customer activity profile 134 may be provided by external service providers which provide activity profiles of users, for example, based on their Internet activity.

The propensity model 136 is configured to determine whether the text (e.g. from the transcript 126) comprises terms which indicate an intent of the customer to escalate the issue. Such terms include, without limitation, "legal action," "consumer court," "sue," and the like, which indicate the customer intends to escalate the matter further. In some embodiments, a lexicon of escalation terms is used and if the terms from the lexicon are in the text, a corresponding determination is made. In some embodiments, the propensity model 136 determines in binary manner, as to whether the customer used escalation terms or not.

The propensity model 136 is further configured to predict a behavior of the customer after a call with the customer is concluded, based on the parameters of customer satisfaction (CSAT), for example, as provided by the CPM 132, the customer activity (CACT), for example as determined using the customer activity profile 134, and whether the customer uses escalation terms (CESC), for example, as determined by the propensity model 136. According to some embodiments, the propensity model 136 predicts the likelihood that the customer will perform certain actions, such as post a negative review about the customer service and/or the business, whether the customer will continue to patronize the business or not, among others. According to some embodiments, the propensity model 136 receives as inputs, a binary determination of customer satisfaction from the CPM 132, and a binary determination of whether the customer is active on social media from the customer activity profile 134. Further, the propensity model 136 makes a binary determination of whether the customer used escalation terms in the conversation. Based on the binary inputs on the abovementioned three parameters, the propensity model determines a propensity score representative of a probability that the customer will perform a particular action, such as those listed above, among other potential actions.

According to some embodiments, the propensity model 136 assigns different weightages to one or more of the three parameters (CSAT, CACT, CESC). For example, the propensity model 136 awards a higher propensity score if the activity level of the customer on social media is high, and/or use of terms relating to escalation in text posted on social media is high. If the customer is active on social media, then the chances are higher that the customer will escalate the issue on social media if the customer is dissatisfied. If the CPM 132 determines that the customer is not satisfied, such a customer is given a higher weightage in calculating propensity scores. In some embodiments, a classification model based on three binary inputs (CSAT, CACT, CESC) is used to determine a probability of escalation. In some embodiments, the propensity score is the probability of whether the customer will post a negative review about the business and/or customer service, for example, using the Internet on some for social media, forums or groups. In some embodiments, the determined probability is used to predict, in a binary manner, whether the customer will escalate an issue on social media.

Figure 2:
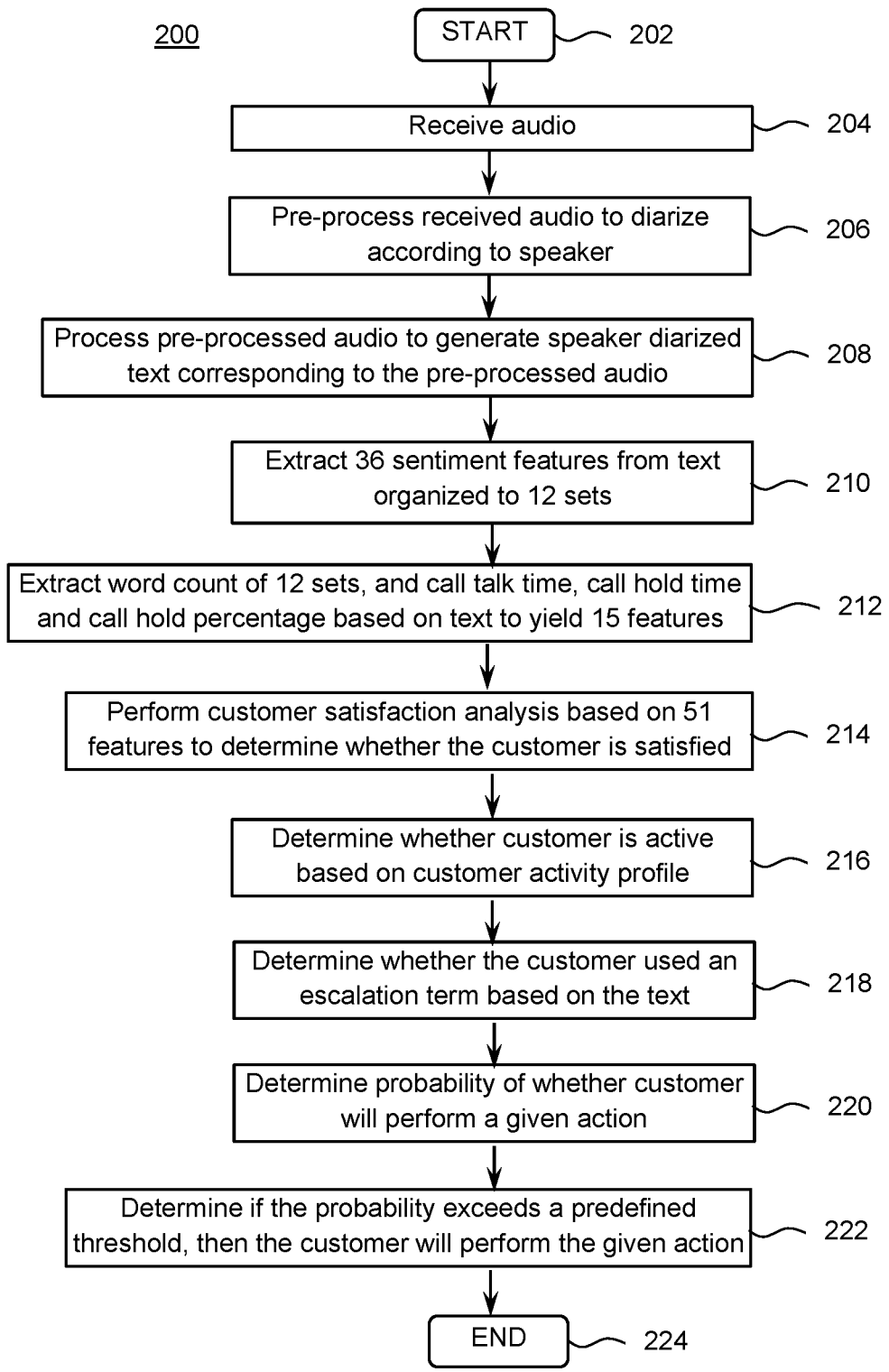
FIG. 2 is a flow diagram of a method for predicting customer behavior on social media, for example, as performed by the apparatus of FIG. 1, in accordance with an embodiment of the present invention.

FIG. 2 is a flow diagram of a method 200 for predicting customer behavior, for example, as performed by the apparatus 100 of FIG. 1, in accordance with an embodiment of the present invention. According to some embodiments, the method 200 is performed by the various modules executed on the CAS 110, such as the SD module 122, the SAM 128, the FEM 130, the CPM 132 and the propensity model 136. The method 200 starts as step 202, and proceeds to step 204, at which the method 200 receives an audio, for example, the audio 120. The audio 120 may be a pre-recorded audio received from an external device such as the call audio source 102, for example, a call center or a call audio storage, or recorded on the CAS 110 from a live call in a call center.

The method 200 proceeds to step 206, at which the method 200 diarizes the audio 120 according to each speaker to yield the pre-processed-audio 124 comprising audio segments according to each speaker. In some embodiments, step 206 is performed by the SD module 122 of FIG. 1.

At step 208, the method 200 processes the pre-processed audio 124 to generate speaker diarized text corresponding to the speech in the pre-processed audio, for example using automatic speech recognition (ASR) techniques. In some embodiments, the pre-processed audio 124 is sent from the CAS 110 to the ASR engine 104 which is remote to the CAS 110, and corresponding transcribed text is received as transcripts from the ASR engine 104, and stored as transcripts 126 on the CAS 110. In some embodiments, the ASR engine 104 is implemented on the CAS 110, or implemented in a local environment of the CAS 110. In some embodiments, sending the pre-processed audio 124 to the ASR 104, and receiving the transcripts 126 from the ASR engine 104 is performed by the SAM 128 of FIG.

At step 210, the method 200 organizes the transcripts 126 in to different text sets corresponding to various permutations of the call sections and the speakers. In some embodiments, the method 200 organizes the transcripts 126 into the following 12 different text steps: (1) entire call; (2) entire agent conversation; (3) entire customer conversation; (4) call beginning, (5) call middle, (6) call end, (7) beginning of agent conversation, (8) middle of agent conversation, (9) end of agent conversation, (10) beginning of customer conversation, (11) middle of customer conversation, and (12) end of customer conversation. In some embodiments, beginning of the call is defined as a predetermined number of first turns of each speaker, or a predetermined time duration, end of the call is defined as a predetermined number of last turns of each speaker, or a predetermined time duration, and middle of the call is defined by removing the call beginning and the call end. Still at step 210, the method 200 performs sentiment analysis on each of the multiple text sets, and identifies multiple parameters for each set. For example, the method 200 performs sentiment analysis on the 12 text sets, and for each set, determines a sentiment score, a percentage and/or count of negative words, a percentage and/or count of positive words corresponding to each of the 12 sets of text, yielding a total of 36 (12×3) sentiment scores. In some embodiments, step 210 is performed by the SAM 128 of FIG. 1.

At step 212, the method 200 extracts word count for each of the sets, and for example, the 12 sets obtained at step 210, yielding 12 additional features of word count. Still at step 212, the method 200 extracts call talk time, call hold time and call hold percentage for the entire call, yielding 3 metadata features, and in total, 15 (12+3) features. In some embodiments, step 212 is performed by the FEM 130 of FIG. 1.

At step 214, the method 200 performs customer satisfaction (CSAT) analysis, for example, using the CPM 132. The CPM 132, which is an AI/ML module, is pre-trained to predict or determine whether the customer is satisfied or not, based on a total of 51 features, that is, the 36 features yielded at step 210, and the 15 features yielded at step 212. In some embodiments, based on the input of 51 features, the CPM 132 determines whether the customer is satisfied or not.

At step 216, the method 200 determined whether the customer is active on social media based on a customer activity profile, for example, the customer activity profile 134 of the customer. In some embodiments, customer activity profile includes information such as activity levels, demographic information, type of websites visited (for example, complaint and review forums), among others. In some embodiments, based on the customer activity information contained in the customer activity profile 134, the method 200 determines whether the customer is active on social media or not. In some embodiments, step 216 is performed by the propensity model 136 of FIG. 1.

At step 218, the method 200 determines whether the customer used an escalation term, by analyzing the transcription 126 text. Escalation terms maybe identified using a predefined lexicon, and include terms that indicate the intent of the customer to escalate the issue in some form, such as "lawsuit," "legal action," "consumer court," "sue," "publish on social media," among similar other terms. In some embodiments, the method 200 determines whether the customer used an escalation term or not. In some embodiments, step 218 is performed by the propensity model 136.

At step 220, the method 200 performs propensity analysis based on the CSAT determination at step 214, the customer activity determination at step 216, and the customer's use of escalation terms at step 220. The analysis yields a propensity score which represents a probability of a behavior of the customer, for example, the customer taking a particular action. The method 200 proceeds to step 222, at which the method 200 determines if the probability exceeds a predefined threshold. If the probability increases the predefined threshold, then the method 200 determines that the customer will perform the particular action. In some embodiments, the propensity score is the probability of whether the customer will post a negative review on social media, and in an example, the predefined threshold value is 0.5. In this example, if the propensity score is determined to be greater than 0.5, then it is determined or predicted that the customer is likely to post a negative review on the social media.

The method 200 proceeds to step 224, at which the method 200 ends.

While the embodiments of the invention have been described with respect to specific examples, the invention is not limited to such examples.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

The invention claimed is:

1. A computer-implemented method for predicting customer behavior, the method comprising:
   organizing a transcribed, diarized text of a conversation in a call, into a predefined number of sets;
   determining features corresponding to a sentiment score, a percentage and/or count of positive words, and a percentage and/or count of negative words for each of the predefined number of sets;
   determining word count features corresponding to the word count for each of the predefined number of sets;
   determining features corresponding to a call talk time, a call hold time and a call hold percentage based on the transcribed text for the entire call;
   determining customer satisfaction based on all the determined features;
   determining customer activity based on a customer activity profile of the customer;
   determining whether the customer used escalation terms in the call, based on the transcribed text; and
   determining a probability of a customer action based on the customer satisfaction, the customer activity and the customer use of escalation terms.

2. The method of claim 1, wherein the predefined number of sets is 12, and corresponds to (1) entire call, (2) entire agent conversation, (3) entire customer conversation, (4) call beginning, (5) call middle, (6) call end, (7) beginning of agent conversation, (8) middle of agent conversation, (9) end of agent conversation, (10) beginning of customer conversation, (11) middle of customer conversation, and (12) end of customer conversation.

3. The method of claim 1, determining the customer satisfaction comprises using an Artificial Intelligence/Machine Learning (AI/ML) module trained to determine whether the customer is satisfied or not, based on an input of all the determined features.

4. The method of claim 1, wherein the customer activity profile customer activity profile includes information such as activity levels, demographic information, or type of websites visited.

5. The method of claim 1, further comprising determining, based on the probability exceeding a predefined threshold value, that the customer is likely to post a negative review on the social media.

6. An apparatus for predicting customer behavior, the apparatus comprising:
   at least one processor;
   a memory communicably coupled to the at least one processor, the memory comprising computer-executable instructions, which when executed by the at least one processor, perform a method comprising:
      organizing a transcribed, diarized text of a conversation in a call, into a predefined number of sets,
      determining features corresponding to a sentiment score, a percentage and/or count of positive words, and a percentage and/or count of negative words for each of the predefined number of sets,
      determining word count features corresponding to the word count for each of the predefined number of sets,
      determining features corresponding to a call talk time, a call hold time and a call hold percentage based on the transcribed text for the entire call,
      determining customer satisfaction based on all the determined features,
      determining customer activity based on a customer activity profile of the customer,
      determining whether the customer used escalation terms in the call, based on the transcribed text, and
      determining a probability of a customer action based on the customer satisfaction, the customer activity and the customer use of escalation terms.

7. The apparatus of claim 6, wherein the predefined number of sets is 12, and corresponds to (1) entire call, (2) entire agent conversation, (3) entire customer conversation, (4) call beginning, (5) call middle, (6) call end, (7) beginning of agent conversation, (8) middle of agent conversation, (9) end of agent conversation, (10) beginning of customer conversation, (11) middle of customer conversation, and (12) end of customer conversation.

8. The apparatus of claim 6, determining the customer satisfaction comprises using an Artificial Intelligence/Machine Learning (AI/ML) module trained to determine whether the customer is satisfied or not, based on an input of all the determined features.

9. The apparatus of claim 6, wherein the customer activity profile customer activity profile includes information such as activity levels, demographic information, or type of websites visited.

10. The apparatus of claim 6, further comprising determining, based on the probability exceeding a predefined threshold value, that the customer is likely to post a negative review on the social media.

* * * * *